(12) United States Patent
Calef, III (10) Patent No.: US 12,197,812 B2
(45) Date of Patent: *Jan. 14, 2025

(54) SYSTEMS AND METHODS FOR AGGREGATING CONTENT

(71) Applicant: DISH Technologies L.L.C., Englewood, CO (US)

(72) Inventor: John C. Calef, III, Colorado Springs, CO (US)

(73) Assignee: DISH Technologies L.L.C., Englewood, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 18/300,297

(22) Filed: Apr. 13, 2023

(65) Prior Publication Data

US 2023/0342107 A1   Oct. 26, 2023

Related U.S. Application Data

(63) Continuation of application No. 17/318,462, filed on May 12, 2021, now Pat. No. 11,656,840, which is a continuation of application No. 15/445,202, filed on Feb. 28, 2017, now Pat. No. 11,016,719.

(60) Provisional application No. 62/440,591, filed on Dec. 30, 2016.

(51) Int. Cl.
| | |
|---|---|
| G06F 3/16 | (2006.01) |
| G06F 40/117 | (2020.01) |
| G10L 13/04 | (2013.01) |
| G10L 13/10 | (2013.01) |

(52) U.S. Cl.
CPC ............ *G06F 3/165* (2013.01); *G06F 40/117* (2020.01); *G10L 13/04* (2013.01); *G10L 13/10* (2013.01)

(58) Field of Classification Search
CPC ........ G10L 13/033; G10L 13/02; G10L 13/08
See application file for complete search history.

(56) References Cited

U.S. PATENT DOCUMENTS

| | | | |
|---|---|---|---|
| 5,930,755 A | 7/1999 | Cecys | |
| 9,792,329 B1 | 10/2017 | Cronin et al. | |
| 10,158,908 B1* | 12/2018 | Ramani | H04N 21/4667 |
| 2003/0028380 A1 | 2/2003 | Freeland et al. | |
| 2008/0086310 A1 | 4/2008 | Campbell | |
| 2008/0269958 A1 | 10/2008 | Filev et al. | |
| 2008/0313130 A1* | 12/2008 | Hammond | G06F 16/951 |
| 2009/0055190 A1 | 2/2009 | Filev et al. | |
| 2009/0132371 A1 | 5/2009 | Strietzel et al. | |
| 2009/0204243 A1 | 8/2009 | Marwaha et al. | |
| 2011/0099168 A1 | 4/2011 | Boyer et al. | |
| 2011/0142413 A1 | 6/2011 | Kang et al. | |
| 2012/0130717 A1 | 5/2012 | Xu et al. | |

(Continued)

*Primary Examiner* — Mark Villena
(74) *Attorney, Agent, or Firm* — KW Law, LLP (57) ABSTRACT

Systems, methods, and devices may generate speech files that reflect emotion of text-based content. An example process includes selecting a first text from a first source of text content and selecting a second text from a second source of text content. The first text and the second text are aggregated into an aggregated text, and the aggregated text includes a first emotion associated with content of the first text. The aggregated text also includes a second emotion associated with content of the second text. The aggregated text is converted into a speech stored in an audio file. The speech replicates human expression of the first emotion and of the second emotion.

18 Claims, 8 Drawing Sheets

(56) References Cited

U.S. PATENT DOCUMENTS

| | | |
|---|---|---|
| 2012/0221338 A1* | 8/2012 | Dow .................... G10L 13/033 |
| | | 704/260 |
| 2012/0276504 A1 | 11/2012 | Chen et al. |
| 2013/0036191 A1 | 2/2013 | Fink et al. |
| 2013/0080565 A1 | 3/2013 | Van Coppenolle et al. |
| 2014/0078183 A1 | 3/2014 | Watson et al. |
| 2014/0215507 A1 | 7/2014 | Wouhaybi et al. |
| 2014/0229964 A1 | 8/2014 | Waisanen et al. |
| 2014/0347368 A1 | 11/2014 | Kishore et al. |
| 2015/0213002 A1 | 7/2015 | Gou et al. |
| 2015/0310020 A1* | 10/2015 | Brav ...................... G06F 40/30 |
| | | 707/730 |
| 2016/0134577 A1 | 5/2016 | Owens et al. |
| 2016/0163332 A1 | 6/2016 | Un et al. |
| 2016/0344828 A1 | 11/2016 | Husler et al. |
| 2018/0089715 A1 | 3/2018 | Ken-Dror |

* cited by examiner

SYSTEMS AND METHODS FOR AGGREGATING CONTENT

CROSS-REFERENCE TO RELATED APPLICATIONS

This application claims priority to U.S. patent application Ser. No. 17/318,462 filed on May 12, 2021 and entitled "SYSTEMS AND METHODS FOR AGGREGATING CONTENT"; and claims priority to U.S. patent application Ser. No. 15/445,202 filed on Feb. 28, 2017, entitled "SYSTEMS AND METHODS FOR AGGREGATING CONTENT", and issued as U.S. Pat. No. 11,016,719; and claims priority to U.S. Provisional Patent Application No. 62/440,591 filed Dec. 30, 2016. Each of the foregoing applications are incorporated by reference in their entirety for any purpose.

TECHNICAL FIELD

The present disclosure generally relates to data communication over a network. More particularly, the following discussion relates to systems, methods, and devices for producing audio representations of aggregated content.

BACKGROUND

It is often desirable for users to consume aggregated content available from a number of websites and other sources over a network, such as the Internet. For example, rather than relying on a single website news source, many users prefer to read content compiled from multiple, less mainstream news sites.

Furthermore, many users consume news and other information while driving or engaging in other activities that do not permit such news to be read directly. While audiobooks and other means of performing text-to-speech conversion exist, such systems tend to produce overly mechanical, unemotional readings of such text, resulting in an unsatisfactory listening experience.

Accordingly, there is a need for improved methods of producing and consuming audio representations of content gathered from network sources. These and other desirable features and characteristics will become apparent from the subsequent detailed description and the claims, taken in conjunction with the accompanying drawings and this background section.

BRIEF DESCRIPTION OF THE DRAWING FIGURES

Exemplary embodiments will hereinafter be described in conjunction with the following drawing figures, wherein like numerals denote like elements, and.

DETAILED DESCRIPTION

Systems and methods are provided for producing audio representations of aggregated content. In accordance with various embodiments, the text content used for aggregation (e.g., the aggregated content itself, or the individual text source) include "emotion tags" or other meta-information indicating how the text content should be read. These emotion tags are then used in the text-to-speech process to produce an audio representation of the aggregated content that includes emotion, thereby improving the listening experience for the user.

Figure 1:
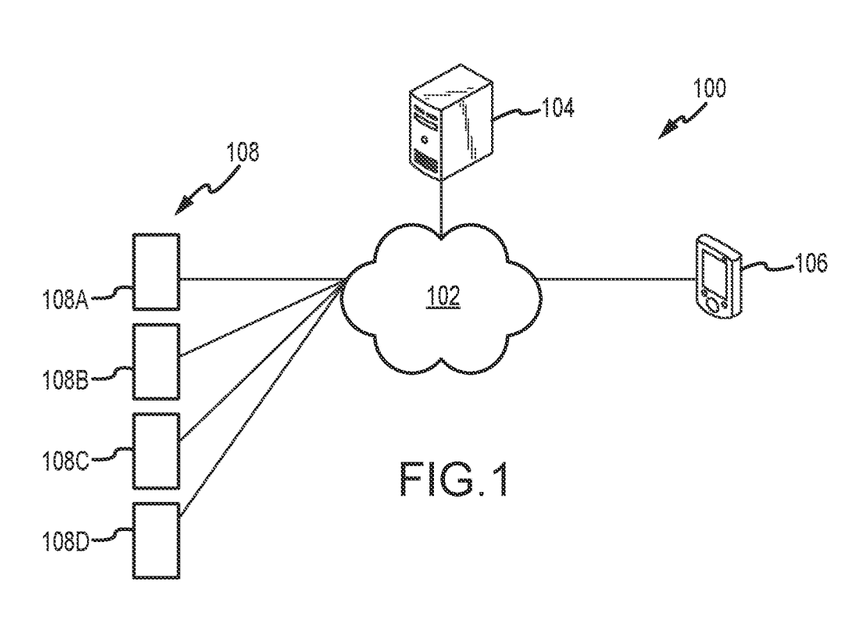
FIG. 1 is a conceptual block diagram illustrating a network in accordance with one embodiment.

Referring to FIG. 1, one or more audio playback devices (or simply "devices") 106 is configured to receive and process media content from one or more content sources (or simply "sources") 108 (e.g., 108a-d). Device 106 may correspond to any combination of hardware and software configured to receive and process media content from a content source (e.g., one or more of content servers 108), including, for example, a motor vehicle media system, a mobile smart-phone, a computer system (such as desktop computer, laptop computer, tablet computer, or the like), a set top box, a television monitor, a place-shifting device, a television receiver, a dedicated media player, or the like. Similarly, sources 108 (e.g., 108a-d) include any combination of hardware and software configured to provide content (e.g., audio and/or visual content) to device 106 over network 102. In some embodiments, sources 108 are servers providing web content (e.g., via HTML, CSS, Javascript, etc.), including text-based news content. Also shown in FIG. 1 is a computing device 104 (including a processor, storage, memory, etc.) configured to request and receive content from sources 108, process that content, and provide aggregated content (in audio form) to device 106, as discussed in further detail below.

While the environment illustrated in FIG. 1 is shown as a single network 150, in practice the environment may include any number of wired and/or wireless network operating within the geographic proximity of a home, office or other structure and that are generally under the control of a single user, family or operator (e.g., a WLAN, the Internet, and the like).

Device 106 may be any device, component, module, hardware and/or the like that is capable of communicating with the server 104 over network 102. As mentioned above, depending on the embodiment, client device 304 may be realized as a motor vehicle media system, a conventional personal computer, portable computer, a tablet computer, workstation and/or other computing system, a mobile (or cellular) telephone, a smartphone, a personal digital assistant, a video game player, and/or any other device capable of receiving content from sources 108 and presenting audio and/or visual content. In this regard, the device 106 includes a display device, such as a monitor, screen, or another conventional electronic display, capable of graphically presenting visual and audio content, data and/or information that is generated or otherwise provided 104. The device 106 may further include a user input device, such as a keyboard, a mouse, a touchscreen, or the like, capable of receiving input data and/or other information from the user of the device 106. The device 106 also includes a processing system and a data storage element (or memory) that is coupled to or otherwise accessed by the processing system and stores programming instructions (e.g., an application downloadable over an "app store"). The processing system may be realized as any sort of processor, microprocessor, microcontroller, digital signal processor, or any other suitable processing device, or any suitable combination thereof. The device 106 may reside at a geographic location that is remote or otherwise physically distinct from the geographic location of the servers 104 and content sources 108.

Device 106 and or server 104 may execute a conventional browser or other client application that is compatible with standard Internet, world wide web (WWW), transmission control protocol, and/or Internet Protocol (TCP/IP), and/or other formats. Such browsers are typically capable of displaying active or other documents formatted in accordance with published protocols and/or computer languages (e.g., hypertext markup language (HTML), extensible markup language (XML), cascading style sheets (CSS), Javascript, and/or the like). Many browsers are also capable of executing "plugin" applications, applets or the like. Such plugins may be formatted in accordance with ActiveX, JAVA, Javascript and/or any number of other formats. A number of commonly used web browsers are available for a number of different computing platforms, and the subject matter described herein is not limited to any particular browser application. In the illustrated embodiment, device 106 further includes a media player application. The media player may be a standalone media player, or the media player may be implemented as a plugin or other applet that runs within the device 106 as desired. In some embodiments, the media player is initially obtained from a networked host, such as server 104. The media player may be retrieved on an as-needed basis in some embodiments, or may be stored at device 106 for subsequent execution.

In the illustrated embodiment, server 104 may be realized as one or more server computers or other device(s) coupled to the network 102 and capable of interacting with the device 106 and content sources 108. The server 104 may be implemented with a server computer system or data processing system that is based upon any processor, architecture and/or operating system, and will typically be implemented using a processing system, memory, and input/output features. Various embodiments may be implemented using dedicated or shared hardware servers; other implementations may make use of virtual server features as part of a "cloud computing" service, such as any of the cloud computing services provided by any number of providers.

While FIG. 1 illustrates a single server 104, many practical embodiments of the system 300 may provide a cluster or other collection of multiple host servers to support any desired number of simultaneous communications with multiple clients and/or multiple media devices. This cluster may also incorporate appropriate routing, load balancing, access and security mechanisms and or any number of other features. In various embodiments, each server 104 is an actual or virtual computer system executing an operating system in conjunction with a processing system, memory and/or I/O features to provide a computing core that is capable of executing a portal application, as well as any number of daemons, processes, applications or other modules as desired.

The user of the device 106 is able to direct server 104 (e.g., via a configuration step intended to select desired content sources 108) to connect to the portal application supported by content sources 108 via the network 102, for example, by directing a client application to a URL or other network address associated with sources 108.

Figure 2:
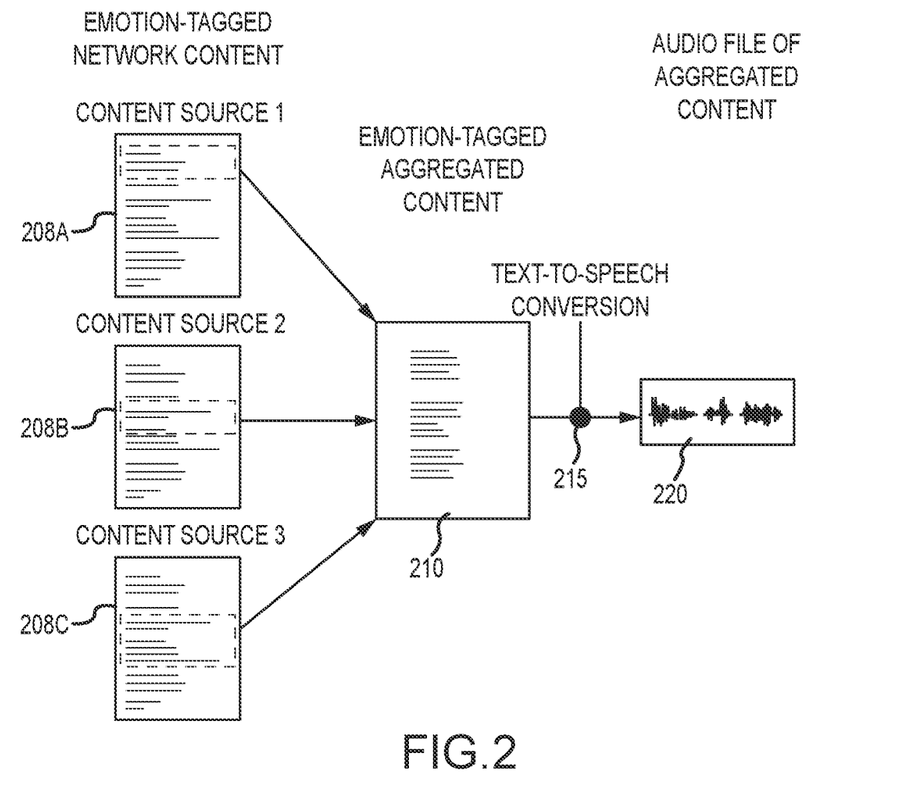
FIG. 2 is a conceptual block diagram depicting the producing of aggregated audio content in accordance with one embodiment.

Referring now to FIG. 2, in one embodiment, one or more text (or HTML) content from content sources 208A, 208B, and 208C, each including "emotion tagging" as discussed in further detail below) is aggregated into emotion-tagged aggregated content 210. Emotion-tagged aggregated content 210 is then converted (via a suitable text-to-speech conversion 215) to an audio file (or audio representation) of emotion-tagged aggregated content 210.

Figure 3:
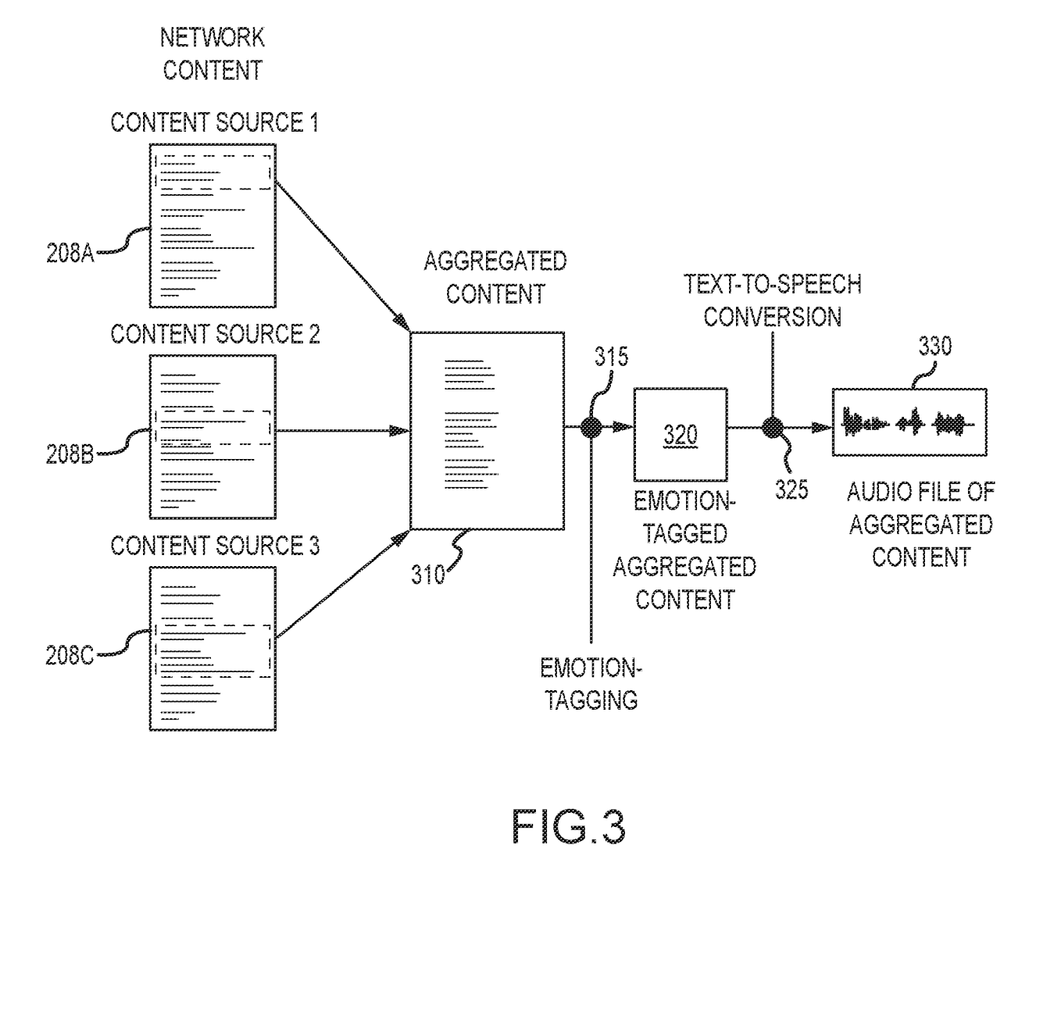
FIG. 3 is a conceptual block diagram depicting the producing of aggregated audio content in accordance with another embodiment.

FIG. 3 depicts another embodiment in which the content sources 208A-B are not themselves emotion-tagged, but rather such tagging is performed after aggregation. That is, aggregated content 310 undergoes a tagging process 315 (e.g., a manual process, an automatic machine-learning model process, etc.) to produce emotion-tagged aggregated content 320. This aggregated content 320 is then subjected to text-to-speech conversion to produce an audio file of aggregated content 330 that can then be played by a user via device 106.

Figure 4:
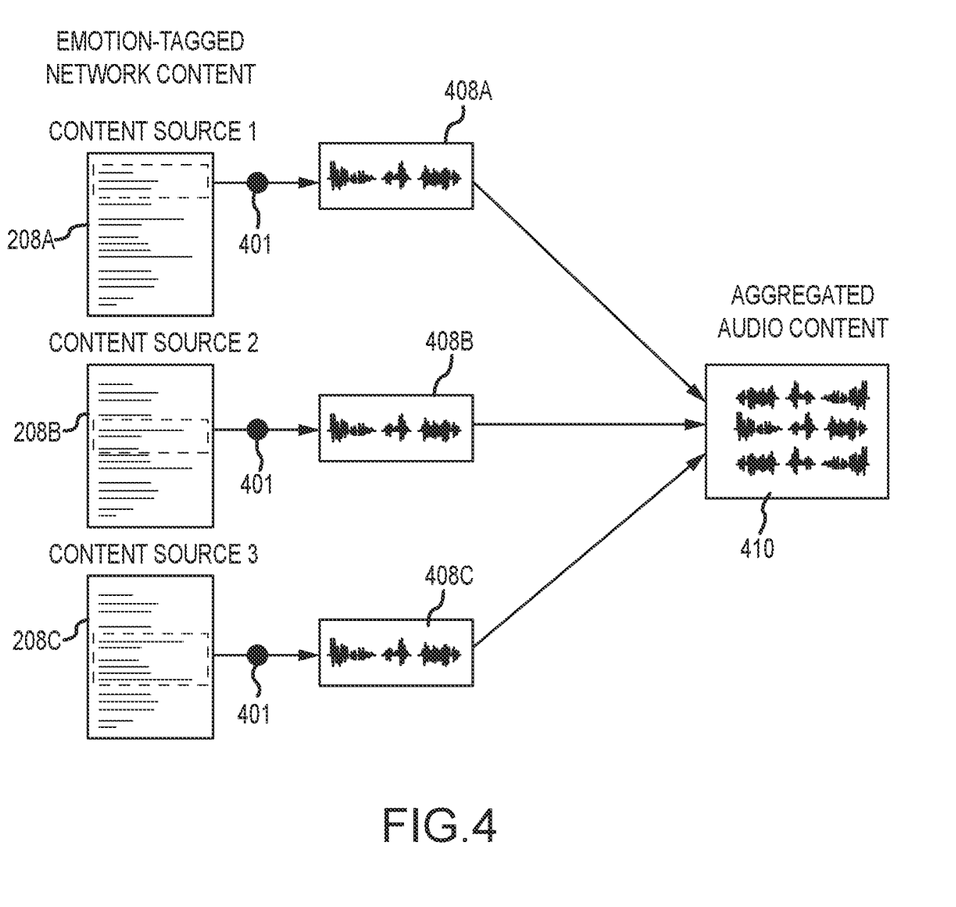
FIG. 4 is a conceptual block diagram depicting the producing of aggregated audio content in accordance with one embodiment.

FIG. 4 depicts yet another embodiment in which each content source 208 has been emotion-tagged, but is individually converted to audio via individual text-to-speech conversions 401, resulting in corresponding audio files (of non-aggregated content) 408A, 408B, and 408C. These individual audio files are then themselves aggregated to form aggregated audio content 410.

Figure 5:
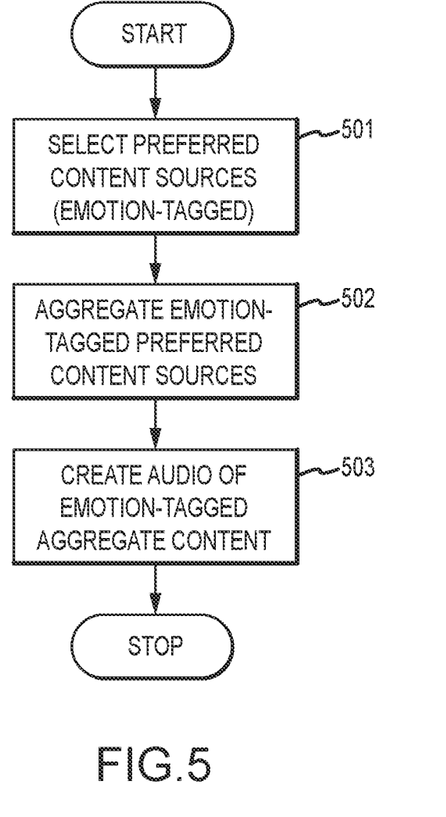
FIGS. 5 and 6 are flowcharts illustrating methods in accordance with various embodiments.

FIG. 5 is a flowchart illustrating a method 500 corresponding to the embodiment depicted in FIG. 2. As illustrated, this method includes first (501) selecting preferred content from a plurality of sources, wherein the sources are emotion-tagged, aggregating the emotion-tagged preferred content sources (502), and then creating (assembling, editing, mixing, etc.) an audio representation of the emotion-tagged aggregated content (503).

Figure 6:
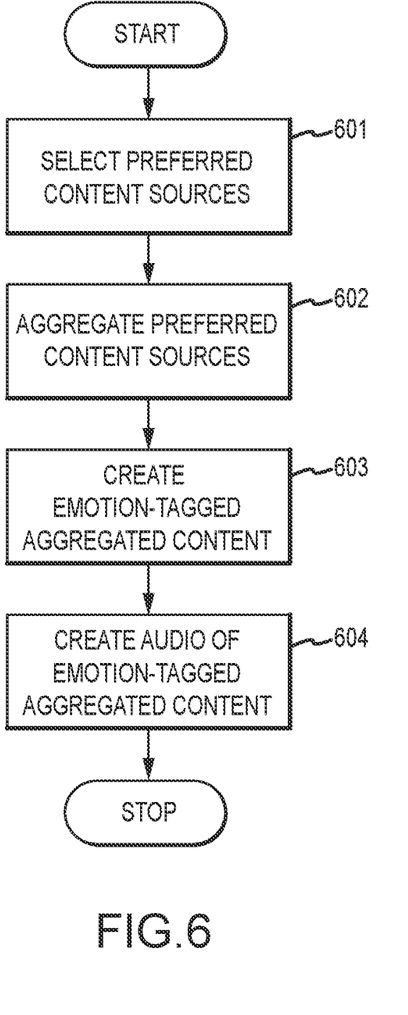

FIG. 6 is a flowchart illustrating a method 600 corresponding to the embodiment depicted in FIG. 3. As illustrated, this method includes first (601) selecting preferred content from a plurality of sources, wherein the sources are not emotion-tagged, aggregating the preferred content sources (602), creating emotion-tagged aggregated content (603), then creating (assembling, editing, mixing, etc.) an audio representation of the emotion-tagged aggregated content (604).

Figure 7:
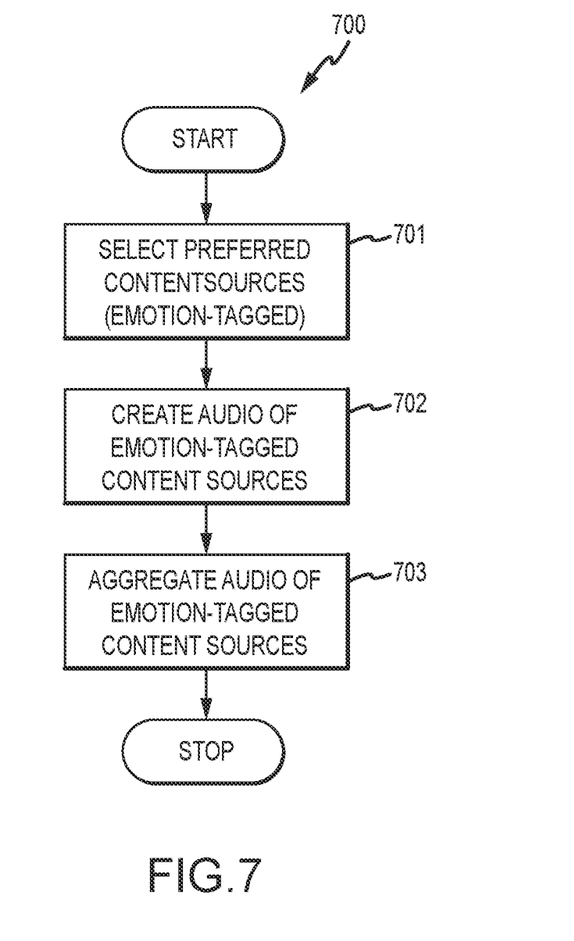
FIGS. 7, 8 and 9 depict various ways of characterizing speech-to-text emotional states in accordance with one or more embodiments.

FIG. 7 is a flowchart illustrating a method 700 corresponding to the embodiment depicted in FIG. 4. As illustrated, this method includes first (701) selecting preferred content from a plurality of sources, wherein the sources are emotion-tagged, creating audio of each of the emotion-tagged content sources (702), and then aggregating the audio of the emotion-tagged preferred content sources (703).

As used herein, the phrase "emotion-tagged" or "emoti-tag" or the like refers to any embedded or meta-information specifying how text-to-speech conversion should take place (e.g., step 503 in FIG. 5). That is, the purpose of the emotion tags is to produce audio that includes emotions that replicate the way that a news announcer, pundit, or other human being might read the text.

In some embodiments, the content (e.g., the individual sources 108 and/or the aggregated content 210) includes custom HTML tags, CSS styles, XML tags, or the like that specify particular emotions. Without loss of generality, the following example is framed as custom HTML tags: <anger> I can't believe what congress just did</anger>. <sarcasm> The guy we all know and love started it all </sarcasm>. <vigilance> We must keep an eye on that guy</vigilance>. <awe> But thankfully our favorite new addition is leading the charge </awe>. <acceptance> So perhaps everything will work out OK. </acceptance>.

Figure 8:
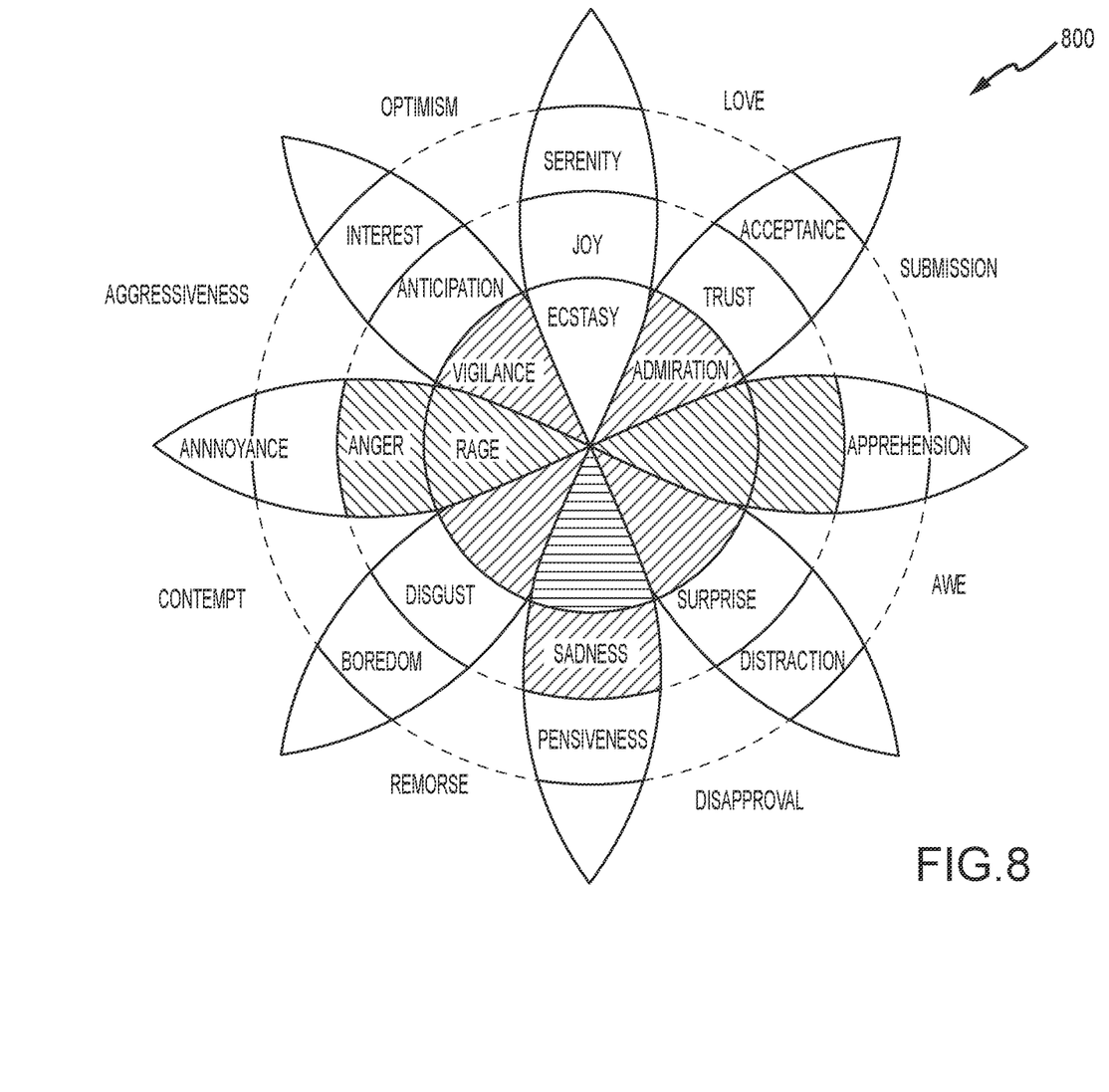
Figure 9:
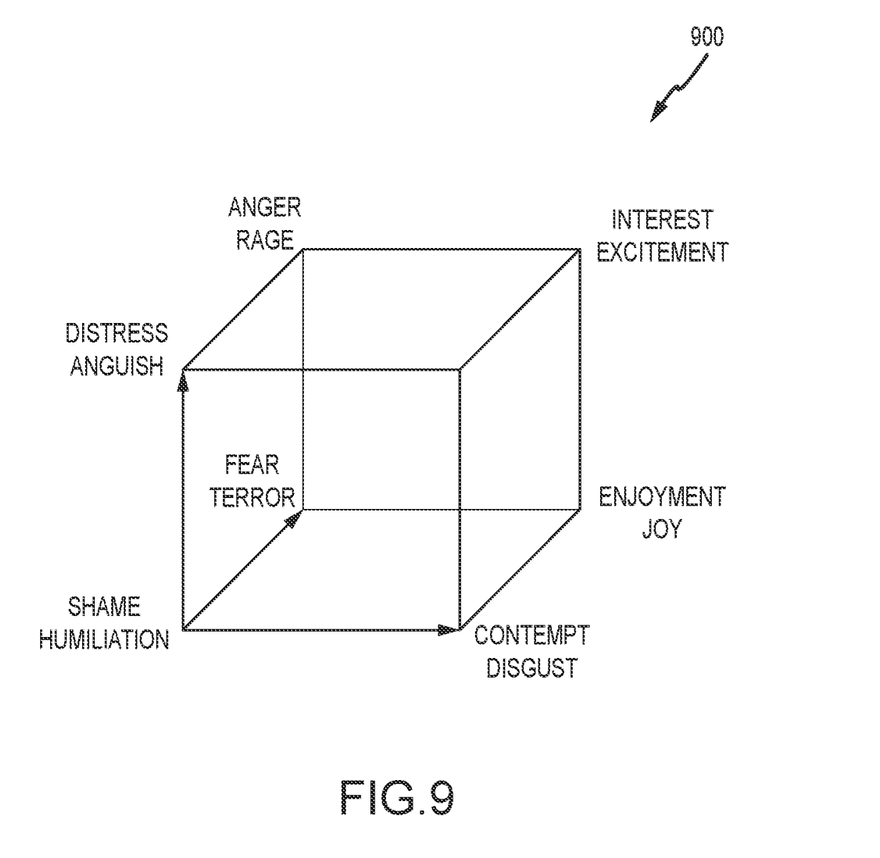

The number and type of emotional tags may vary, depending upon design considerations. FIG. 8, for example, depicts what is known as the Plutchick wheel of emotions, which may be used in determining appropriate emotion tags. FIG. 9 depicts a simpler, Lovheim-cube-based representation of emotions that also may be used in determining appropriate emotion tags. It will be appreciated that the emotion taxonomies depicted in these figures are merely provided as an example, and that the range of possible embodiments is not so limited.

Regardless of the particular tags used, it will be appreciated that the various steps illustrated above may be performed by any combination of server 104 and 106. For example, device 106 may be provided with emotion-tagged text, whereupon it uses that text to convert it to suitable speech. In other embodiments, server 104 performs these steps. In some embodiments, device 106 pulls content from content sources 108. In other embodiments, server 104 pulls and compiles the aggregated content.

The audio file produced in connection with the illustrated steps may be any suitable format, including various uncompressed, lossles, lossy, or other formats. Suitable formats include, for example, WAV, MP3, AIFF, OGG, M4A, WMA, or any other suitable format. The audio may be streamed and/or downloaded onto device 106.

In addition to producing an audio version of the aggregated content, a visual representation of an avatar, human being, or other entity may be created (and displayed to the user). That is, an animated avatar (e.g., with moving lips and appropriate expression based on the emotion tags) may be used to "read" the news to the user using a display present within device 106.

Selection of preferred sources may be performed by the user via a suitable user interface that allows the user to select the sources and optionally specify a "weighting factor" or the like that controls how often that source is used for the aggregated content. That is, the user may specify that content from cnn.com should be given a relatively low weight of "1", while fox.com should be given a relatively high weight of "8".

Many other modifications and enhancements could be provided in a wide array of alternate but equivalent embodiments. The term "exemplary" is used herein to represent one example, instance or illustration that may have any number of alternates. Any implementation described herein as exemplary is not necessarily to be construed as preferred or advantageous over other implementations. While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of elements described without departing from the scope of the claims and their legal equivalents.

What is claimed is:

1. A method comprising:
    applying a user-specified weighting factor to a plurality of content sources to select a first source of text content and a second source of text content;
    selecting a first text from the first source of text content;
    selecting a second text from the second source of text content;
    aggregating the first text and the second text into an aggregated text, wherein the aggregated text includes a first emotion associated with a first content of the first text and a second emotion associated with a second content of the second text;
    tagging the aggregated text with a first emotion tag and a second emotion tag using an automated machine-learning model to generate a tagged aggregation; and
    converting the tagged aggregation into a speech stored in an audio file, wherein the speech replicates human expression of the first emotion in response to the first emotion tag, and wherein the speech replicates the human expression of the second emotion in response to the second emotion tag.

2. The method of claim 1, wherein tagging the aggregated text further comprises tagging the aggregated text with the first emotion tag in response to the first content and with the second emotion tag in response to the second content.

3. The method of claim 1, further comprising applying a weight to the first source to select the first text.

4. The method of claim 1, wherein a mobile device aggregates the first text and the second text into the aggregated text.

5. The method of claim 1, wherein a mobile device converts the tagged aggregation into the speech.

6. The method of claim 1, wherein the aggregated text is tagged with a Lovheim-cube-based representation of the first emotion.

7. A media device including a processor in communication with a non-transitory computer readable medium configured to store instructions that, when executed by the processor, cause the media device to perform operations, the operations comprising:
    applying a user-specified weighting factor to a plurality of content sources to select a first source of text content and a second source of text content;
    selecting a first text from the first source of text content;
    selecting a second text from the second source of text content;
    tagging the first text with a first emotion tag and the second text with a second emotion tag using an automated machine-learning model;
    aggregating the first text and the second text into a tagged aggregation, wherein the tagged aggregation includes a first emotion associated with a first content of the first text and a second emotion associated with a second content of the second text; and
    converting the tagged aggregation into a speech stored in an audio file, wherein the speech replicates human expression of the first emotion and of the second emotion.

8. The media device of claim 7, wherein the operations further comprise tagging the first text with the first emotion in response to the first content and tagging the second text with the second emotion in response to the second content.

9. The media device of claim 7, wherein the first text is tagged with the first emotion and the second text is tagged with the second emotion before aggregating the first text and the second text into the tagged aggregation.

10. The media device of claim 7, wherein the operations further comprise applying a weight to the first source to select the first text.

11. The media device of claim 7, wherein a mobile device aggregates the first text and the second text into the tagged aggregation.

12. The media device of claim 7, wherein a mobile device converts the tagged aggregation into the speech.

13. The media device of claim 7, wherein the first text is tagged with a Lovheim-cube-based representation of the first emotion.

14. A method, comprising:
- applying a user-specified weighting factor to a plurality of content sources to select a first content source and a second content source;
- aggregating a first text from the first content source and a second text from the second content source to create an aggregated text;
- tagging the aggregated text with a first emotion associated with the first text and a second emotion associated with the second text using an automated machine-learning model to generate a tagged aggregation; and
- converting the tagged aggregation into a speech stored in an audio file, wherein the speech replicates human expression of the first emotion while reading the first text, and wherein the speech replicates human expression of the second emotion while reading the second text.

15. The method of claim 14, further comprising tagging the aggregated text with the first emotion in response to a first piece of content from the first content source and with the second emotion in response to a second piece of content from the second content source.

16. The method of claim 14, further comprising applying a weight to the first content source to select the first text associated with a first piece of content.

17. The method of claim 14, wherein a mobile device aggregates the first text and the second text into the aggregated text.

18. The method of claim 14, wherein the first text is tagged with a Lovheim-cube-based representation of the first emotion.

* * * * *